United States Patent
Raghavan et al.

(10) Patent No.: US 12,341,585 B2
(45) Date of Patent: Jun. 24, 2025

(54) METHOD OF ALLOCATION OF REFERENCE SIGNALS FOR BEAMFORMING WITH NON-PLANAR ANTENNA MODULES

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US)

(*) Notice: Subject to any disclaimer, the term of this patent is extended or adjusted under 35 U.S.C. 154(b) by 76 days.

(21) Appl. No.: 18/187,361

(22) Filed: Mar. 21, 2023

(65) Prior Publication Data
US 2024/0322873 A1    Sep. 26, 2024

(51) Int. Cl.
*H04B 7/06* (2006.01)
*H04L 5/00* (2006.01)

(52) U.S. Cl.
CPC ......... *H04B 7/0617* (2013.01); *H04L 5/0048* (2013.01)

(58) Field of Classification Search
CPC .. H04B 7/0617; H04B 7/0404; H04B 7/0874; H04B 7/088; H04B 7/0628; H04L 5/0048; H04L 5/0023; H04L 5/0051

USPC .......................................................... 375/267
See application file for complete search history.

(56) References Cited

U.S. PATENT DOCUMENTS

| | | | |
|---|---|---|---|
| 2018/0034527 A1* | 2/2018 | Noh | H04B 7/0628 |
| 2021/0136598 A1 | 5/2021 | Raghavan et al. | |
| 2021/0242919 A1* | 8/2021 | Park | H04B 7/0617 |
| 2021/0344408 A1 | 11/2021 | Raghavan et al. | |

FOREIGN PATENT DOCUMENTS

WO     2022254088 A1    12/2022

OTHER PUBLICATIONS

International Search Report and Written Opinion—PCT/US2024/020195—ISA/EPO—Jul. 10, 2024.

* cited by examiner

*Primary Examiner* — Fitwi Y Hailegiorgis

(57) ABSTRACT

Certain aspects of the present disclosure provide a method for wireless communications at a user equipment (UE). The UE may transmit signaling indicating antenna module capability information including geometric shape information associated with one or more antenna modules of the UE. The UE may receive an indication of a number of reference signals (RSs). The number of RSs is based on the antenna module capability information. The UE may perform beamforming, in accordance with the received indication.

22 Claims, 12 Drawing Sheets

METHOD OF ALLOCATION OF REFERENCE SIGNALS FOR BEAMFORMING WITH NON-PLANAR ANTENNA MODULES

BACKGROUND

Field of the Disclosure

Aspects of the present disclosure relate to wireless communications, and more particularly, to techniques for allocating and configuring reference signals (RSs) for beamforming.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes transmitting signaling indicating antenna module capability information comprising geometric shape information associated with one or more antenna modules of the UE; receiving an indication of a number of reference signals (RSs), wherein the number of RSs is based on the antenna module capability information; and performing beamforming, in accordance with the received indication.

Another aspect provides a method for wireless communications at a network entity. The method includes receiving signaling indicating antenna module capability information comprising geometric shape information associated with one or more antenna modules of a UE; and transmitting an indication of a number of RSs for beamforming, wherein the number of RSs is based on the antenna module capability information.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for allocating and configuring reference signals (RSs) or beams for beamforming.

In millimeter wave (mmW) systems, beamforming technologies are used to increase directional antenna array gain. Increases in antenna array gain may improve the quality of signal transmission and reception.

In some cases, devices such as user equipments (UEs) and network entities using wireless communication technologies may include multiple antenna modules. Each antenna module may include one or more transmission and reception antennas or arrays that can be co-phased and are configured to transmit and receive communications over a single spatial stream/beam. To train for beamforming at a UE, a UE receive (Rx) beam sweep may be performed, to help select an optimal beam from a set of different beams. The beamforming may also improve signal-to-noise ratio (SNR) of received signals, eliminate undesirable interference sources, and focus transmitted signals to specific locations.

In some cases, a network entity may allocate and configure a fixed number of reference signals (RSs) for the UE (e.g., with one or more antenna modules) for beamforming. In such cases, an Rx array gain corresponding to the certain of the antenna modules may be low. The low Rx array gain may result in a lower path diversity, which may decrease communication reliability.

Techniques proposed herein may help enhance communication reliability, by enabling the network entity to dynamically allocate and configure the RSs for the UE. In some cases, the RS allocation may be based on information from the UE regarding its antenna modules. For example, the UE may provide geometric shape information associated with different antenna modules of the UE to the network entity. The network entity may then allocate and configure an appropriate number of RSs for the UE for adaptive and/or dynamic beam weight learning based on the geometric shape information associated with the different antenna modules. The techniques proposed herein may lead to a higher Rx array gain for the UE, which may result in a higher path diversity and increased communication reliability.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
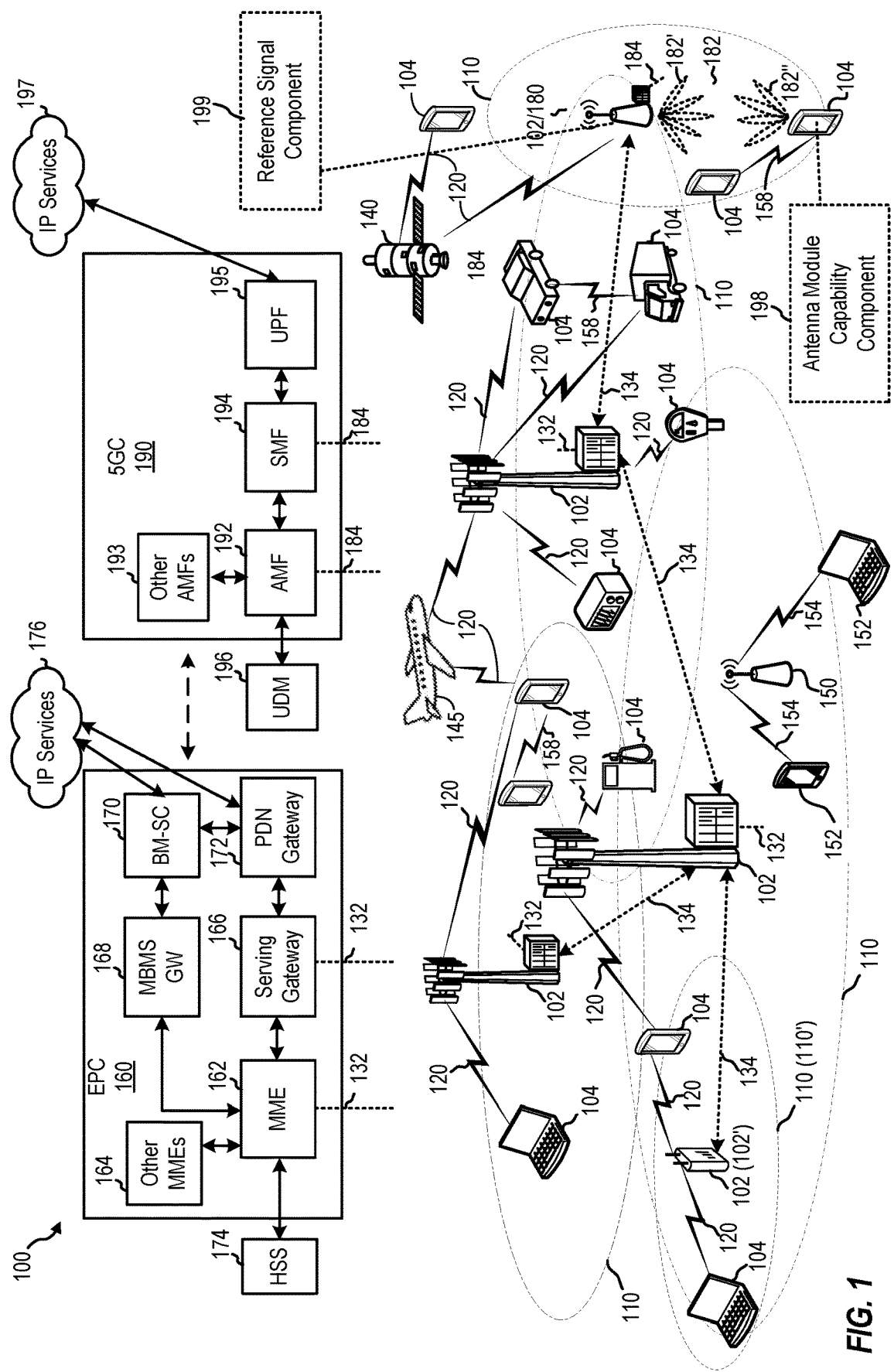
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
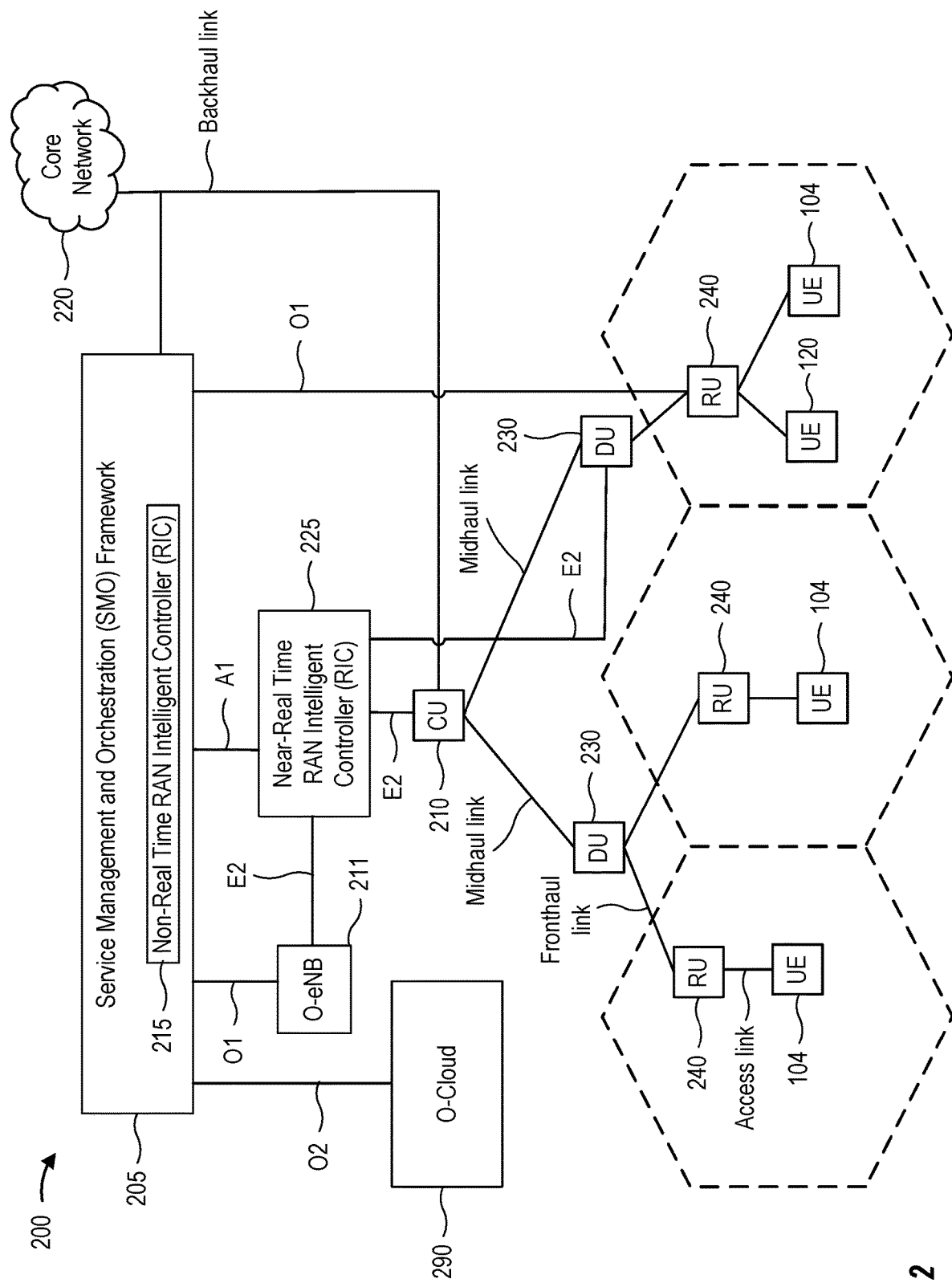
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHZ, which is sometimes referred to (interchangeably) as a "millimeter wave" ("mmW" or "mmWave"). A BS configured to communicate using mm Wave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182"'. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 9:
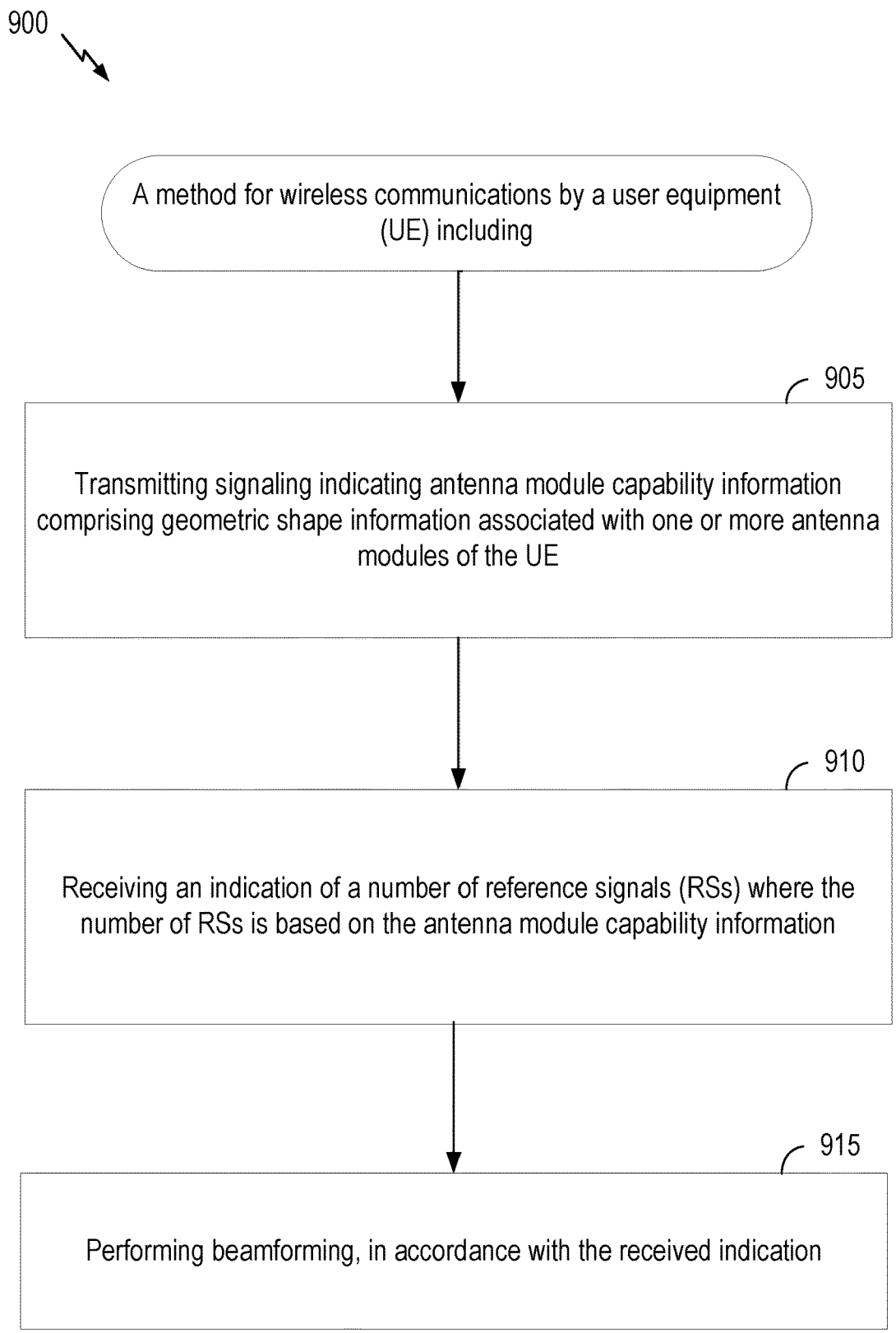
FIG. 9 depicts a method for wireless communications at a UE.

Wireless communication network 100 further includes antenna module capability component 198, which may be configured to perform method 900 of FIG. 9. Wireless communication network 100 further includes reference signal (RS) component 199, which may be configured to perform method 1000 of FIG. 10.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
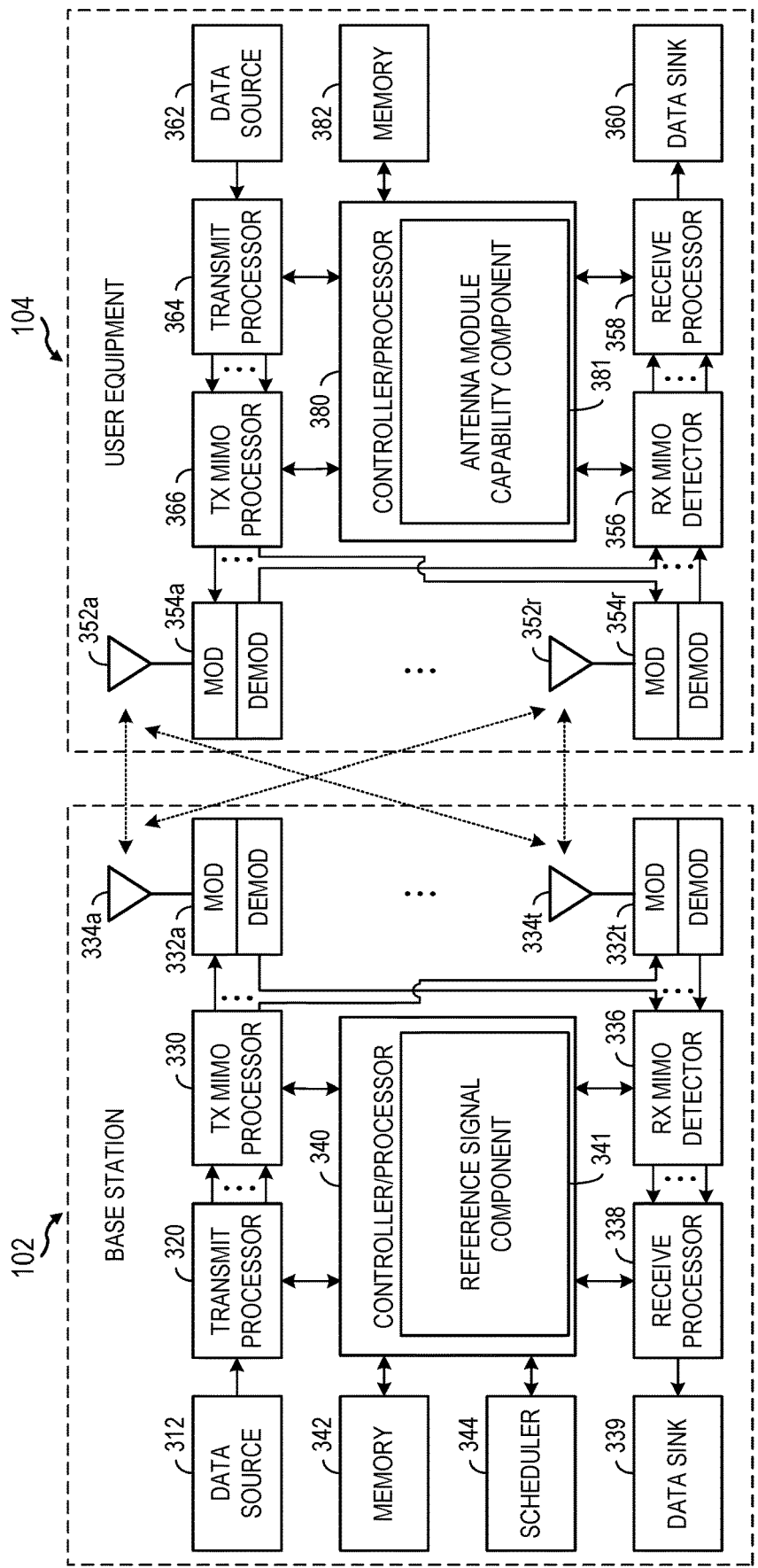
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes RS component 341, which may be representative of RS component 199 of FIG. 1. Notably, while depicted as an aspect of controller/processor 340, RS component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes antenna module capability component 381, which may be representative of antenna module capability component 198 of FIG. 1. Notably, while depicted as an aspect of controller/processor 380, antenna module capability component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
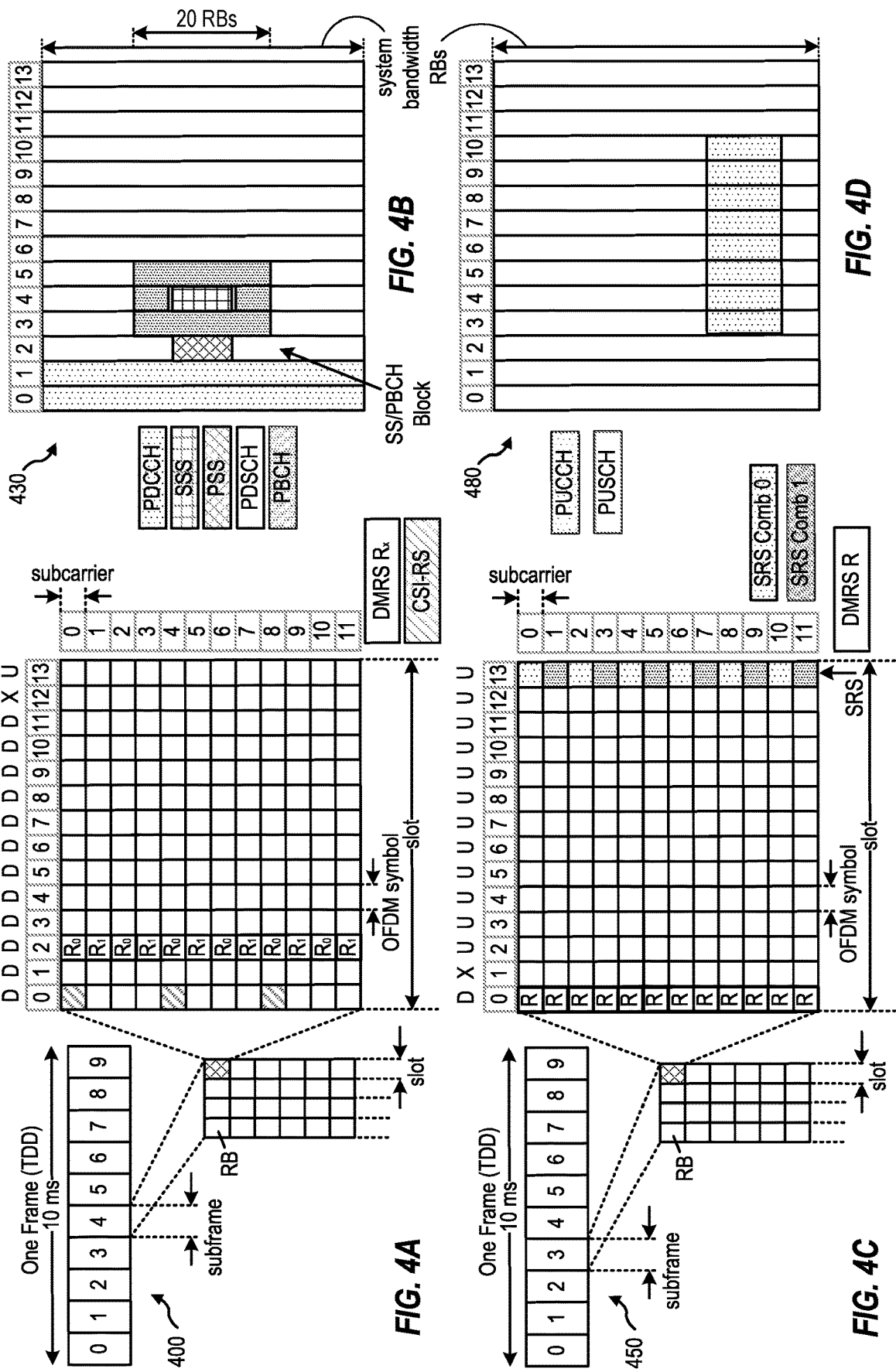
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu} \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5th generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Beamforming

In millimeter wave (mmW) systems, beamforming technologies are used to increase antenna array gain. For example, devices such as user equipments (UEs) and network entities using wireless communication technologies may include multiple antenna modules. Each antenna module may include one or more transmission and reception antennas or arrays that can be co-phased and are configured to transmit and receive communications over one or more spatial streams/beams. The use of the multiple antenna modules may afford the ability to meet spherical coverage requirements with/without hand/body blockage as well as robustness with beam switching over the antenna modules.

Increases in antenna array gain facilitate a better quality of signal transmission and reception. To provide antenna array gain in a particular direction, beamforming is considered. Beamforming is a technique that utilizes advanced antenna technologies on both UEs and network entities to focus a wireless signal according to a set of beam weights (e.g., in a specific direction), rather than broadcasting to a wide area. For beamforming at a UE, it usually includes a UE receive (Rx) beam sweep from a set of different beams. Beamforming may improve signal-to-noise ratio (SNR) of received signals, eliminate undesirable interference sources, and focus transmitted signals to specific locations.

Beamforming is also performed to establish a link between the network entity and the UE, where both these devices form a beam corresponding to each other. For example, both the network entity and the UE find at least one adequate beam to form a communication link between each other. Network entity-beam and UE-beam form what is known as a beam pair link (BPL). As an example, on a downlink (DL), the network entity uses a transmit beam and the UE uses a receive beam corresponding to the transmit beam to receive a downlink transmission. The combination of the transmit beam and the corresponding receive beam is the BPL.

In some cases, a network entity may allocate and configure a fixed number of reference signals (RSs) or beams for the UE (e.g., with one or more antenna modules) for beamforming. In such cases, an Rx array gain corresponding to the one or more antenna modules of the UE may be low. The low Rx array gain may result in a lower signal strength improvement (e.g., reference signal received power (RSRP)), which may decrease communication reliability.

Aspects Related to Codebook Learning Vs. Reference Signal (RS) Allocation Tradeoffs in an L-Shaped or a Non-Planar Antenna Module Aspects of the present disclosure provide apparatuses, methods, processing systems, and computer-readable mediums for allocating and configuring reference signals (RSs) or beams for beamforming.

For example, techniques proposed herein may enable a network entity to dynamically allocate and configure RSs for a user equipment (UE) to help enhance beamformed communications based on information regarding antenna modules at the UE. For example, the UE may transmit geometric shape information associated with different antenna modules of the UE to the network entity, and then the network entity allocates and configures an appropriate number of RSs for the UE for adaptive and/or dynamic beam weight learning based on the geometric shape information associated with the different antenna modules.

The techniques proposed herein may lead to a higher Rx array gain corresponding to the different antenna modules for the UE. The higher Rx array gain may result in a higher signal strength improvement, which may increase communication reliability. The techniques proposed herein may be understood with reference to FIGS. 5-10.

Figure 5:
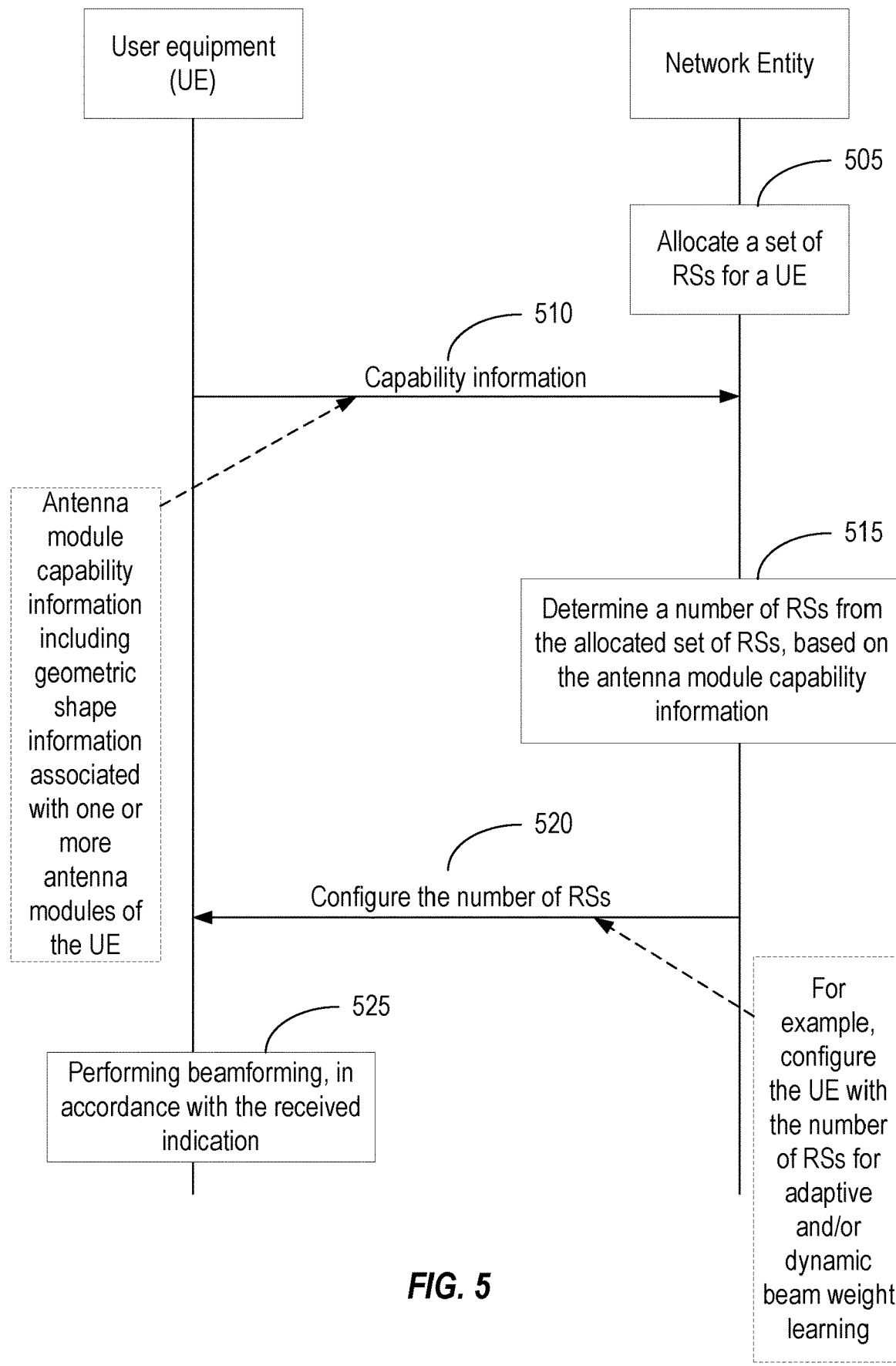
FIG. 5 depicts a call flow diagram illustrating example communication among a UE and a network entity.

FIG. 5 depicts a call flow diagram illustrating example communication among a UE and a network entity. In some aspects, the network entity shown in FIG. 5 may be an example of the BS depicted and described with respect to FIGS. 1 and 3 or a disaggregated base station depicted and described with respect to FIG. 2. Similarly, the UE shown in FIG. 5 may be an example of UE 104 depicted and described with respect to FIGS. 1 and 3

At 505, the network entity allocates a set of RSs for the UE. The set of RSs may include two or more RSs. The network entity may transmit signaling to the UE indicating the set of RSs allocated for the UE.

As shown at 510, the UE transmits signaling indicating antenna module capability information to the network entity. The antenna module capability information includes data corresponding to one or more antenna modules of the UE.

For example, the antenna module capability information may indicate geometric shape information associated with each antenna module of the UE. The geometric shape information associated with each antenna module indicates a geometric shape of each antenna module. The geometric shape information associated with each antenna module further indicates a number of (e.g., orthogonal or independent) sides of each antenna module. The geometric shape information associated with each antenna module further indicates a number of antennas or antenna elements on each side of each antenna module.

In one example, the antenna module capability information may indicate three antenna modules (e.g., a first antenna module, a second antenna module, and a third antenna module) of the UE. The antenna module capability information may further indicate a first shape (e.g., L shape) associated with each antenna module of the UE.

Figure 6:
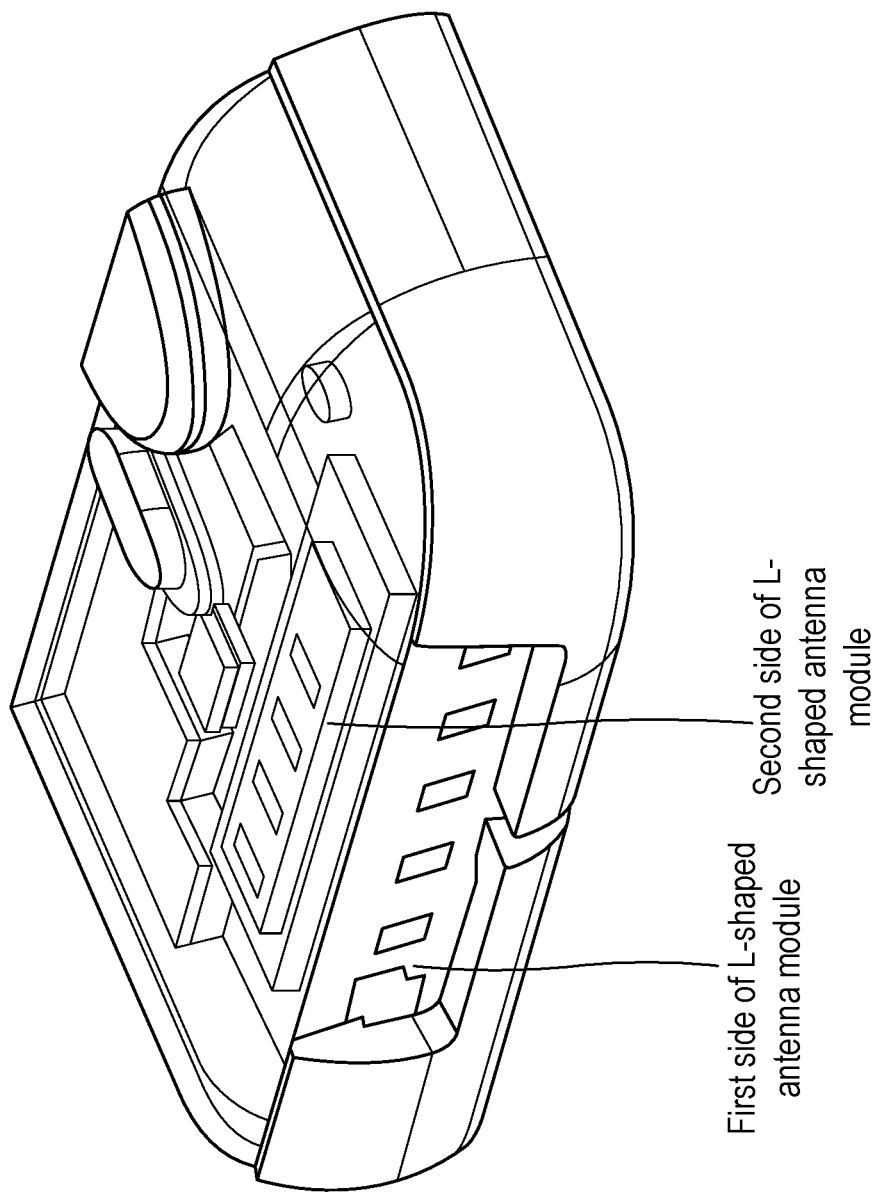
FIG. 6 depicts a portion of a UE with an L-shaped antenna module.

One example of L-shaped antenna module having two sides is illustrated in FIG. 6. The antenna module capability information may further indicate a number of sides of each antenna module (e.g., two sides based on the L shape of the antenna module). The antenna module capability information may further indicate a number of antennas or antenna elements on each side of each antenna module of the UE.

In another example, the antenna module capability information may indicate two antenna modules (e.g., a first antenna module and a second antenna module) of the UE. The antenna module capability information may further indicate a first shape (e.g., L shape) associated with the first antenna module and a second shape (e.g., V shape associated with two non-orthogonal sides) associated with the second antenna module. The antenna module capability information may further indicate a number of sides of each antenna module (e.g., two sides of the first antenna module based on its L shape and two sides of the second antenna module based on its V shape). The antenna module capability information may further indicate a number of antennas or antenna elements on each side of each antenna module of the UE. In some cases, the antenna modules at the UE can be of either a planar array type (e.g., linear arrays) or a non-planar array type (e.g., L shaped module).

In certain aspects, the antenna module capability information also indicates a preference for a specific number of RSs (that can be allocated for the UE and/or configured at the UE) to achieve a specific level of beamforming performance (e.g., receive (Rx) array gain) at the UE. This preference of the UE may be substantial since beamforming gains are associated with costs related to increased power consumption relative to the beamforming performance improvement.

In one example, the antenna module capability information may indicate a preference for a first number of RSs to achieve a first level of beamforming performance at the UE. The first number of RSs is based on an estimation of at least one channel parameter (e.g., a first channel parameter) associated with a channel between the UE and the network entity. The first channel parameter corresponds to an angular spread of a dominant cluster in the channel between the UE and the network entity.

In another example, the antenna module capability information may indicate a preference for a second number of RSs to achieve a second level of beamforming performance. The second number of RSs is based on an estimation of multiple channel parameters (e.g., the first channel parameter, a second channel parameter) associated with the channel between the UE and the network entity.

In another example, the antenna module capability information may indicate the first number of RSs to achieve the first level of beamforming performance at the UE and the second number of RSs to achieve the second level of beamforming performance at the UE. The antenna module capability information may further indicate a performance gap or difference between the first level of beamforming performance and the second level of beamforming performance.

Referring back to FIG. 5, at 515, the network entity determines a number of RSs (e.g., 5 RSs, 10 RSs, 20 RSs, etc.) based on the antenna module capability information. In some cases, the network entity determines the number of RSs from the allocated set of RSs based on the antenna module capability information.

In one example, the number of RSs may be based on the geometric shape of each antenna module of the UE.

In another example, the number of RSs may be based on the geometric shape of at least one antenna module of the UE.

In another example, the number of RSs may be based on a number of sides of each antenna module of the UE.

In another example, the number of RSs may be based on a number of sides of at least one antenna module of the UE.

In another example, the number of RSs may be based on a number of antennas or antenna elements on each side of each antenna module of the UE.

In another example, the number of RSs may be based on a number of antennas or antenna elements on at least one side of at least one antenna module of the UE.

In another example, the number of RSs may be based on the level of beamforming performance desired at the UE.

In another example, the number of RSs may be based on the preference of the UE.

In another example, in one particular way of beam weight learning, the number of RSs may be between 1 and $9N-2$ where N is the number of antennas or antenna elements on each side of each antenna module of the UE.

As further shown in FIG. 5, the network entity transmits an indication of the number of RSs to the UE. For example, as shown at 520, the network entity may configure the UE with the number of RSs for adaptive and/or dynamic beam weight learning.

At 525, the UE performs beamforming, in accordance with the received indication. In one example, the UE may achieve X level of the beamforming performance at the UE based on 5 RSs configured by the network entity. In another example, the UE may achieve Y level of the beamforming performance at the UE based on 10 RSs configured by the network entity. In another example, the UE may achieve Z level of the beamforming performance at the UE based on 20 RSs configured by the network entity. In some cases, the Z level of the beamforming performance is higher than the Y level of the beamforming performance, and the Y level of the beamforming performance is higher than the X level of the beamforming performance.

Figure 7:
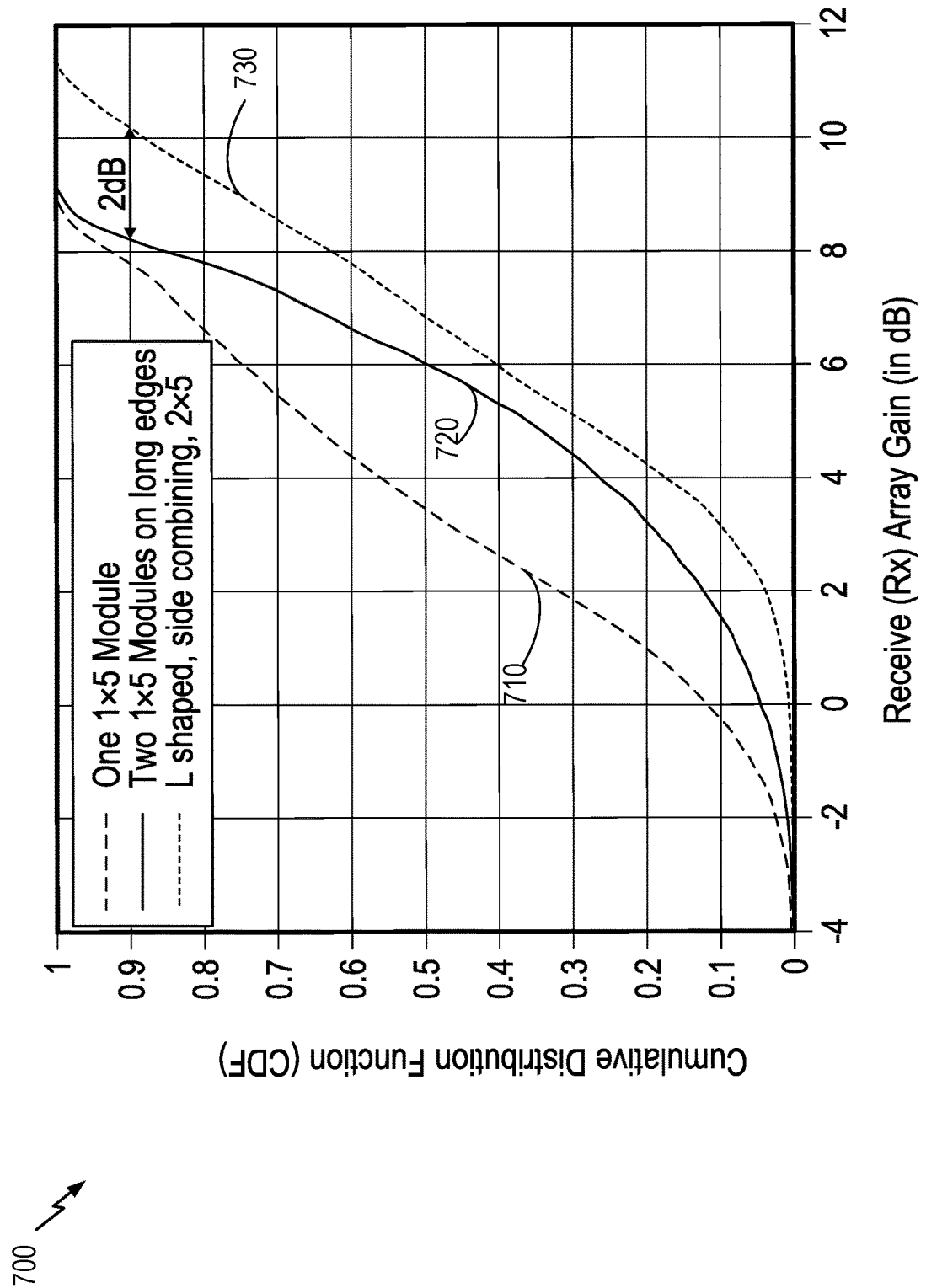
FIG. 7 depicts receive (Rx) array gains for different antenna modules of different wireless nodes or devices based on dynamic beamforming codebooks.

FIG. 7 depicts Rx array gains (directivity) 700 for different antenna modules of different wireless nodes or devices (e.g., a UE, a network entity) based on dynamic beamforming codebooks. The antenna modules include a first antenna module 710 (e.g., one 1×5 module), a second antenna module 720 (e.g., which may include two sub antenna modules such as two 1×5 modules), and a third antenna module 730 (e.g., L-shaped antenna module).

As depicted, the third antenna module 730 based on a dynamic beamforming codebook has a higher Rx array gain than the second antenna module 720 based on the dynamic beamforming codebook, and the second antenna module 720 based on the dynamic beamforming codebook has a higher Rx array gain than the first antenna module 710 based on the dynamic beamforming codebook. The higher Rx array gain may provide a higher signal strength, which may increase communication reliability.

In certain aspects, a beamforming codebook may include a set of beams. In one example, the beamforming codebook may be an analog beamforming codebook. In another example, the beamforming codebook may be a hybrid beamforming codebook.

In certain aspects, beamforming codebooks for antenna arrays (e.g., linear antenna arrays, planar antenna arrays) may be determined via RSs or beams (such as steerable beams, discrete Fourier transform (DFT) beams). For example, with N number of beams covering an N×1 antenna array, a worst-case Rx array gain for the N×1 antenna array may be ~4 decibel (dB) from a peak Rx array gain performance. To bridge this gap of ~4 dB, a higher number of beams (i.e., more than the N number of beams) may be used. For example, K number of beams (where K=2N) may be used over a same coverage area of the N×1 antenna array to bridge the gap of ~4 dB.

The first antenna module 710 and the second antenna module 720 may have antennas on one side. The third antenna module 730 may have a higher Rx array gain performance than the first antenna module 710 and the second antenna module 720 due to optimally combining antennas across two sides of the third antenna module 730 with optimal polarization. A wireless node having the third antenna module 730 may construct optimal phases and/or amplitudes for all antennas of the third antenna module 730 by optimally combining polarizations (e.g., co-polarization and/or cross-polarization across the two sides of the third antenna module 730).

In certain aspects, the third antenna module 730 may include N number of antennas on each of its two sides. One technique to learn an optimal set of beam weights for the third antenna module 730 may require 3N beams (e.g., for amplitude estimation on both sides of the third antenna module 730), 2(N−1) beams (e.g., for phase selection across a first side of the third antenna module 730), and 2(2N)=4N beams (e.g., for phase and polarization selection across a second side of the third antenna module 730). That is, the wireless node may need 9N−2 beams for an optimal beam weight learning. In one example, when N is equal to 4, the wireless node needs 34 beams for the optimal beam weight learning. In another example, when N is equal to 5, the wireless node needs 43 beams for the optimal beam weight learning. That is, learning of optimal, adaptive, and/or dynamic beam weights by the wireless node may consume beam or RS resources proportionate to antenna dimensions of the third antenna module 730. Furthermore, enormous beam or RS resources consumption may lead to considerable power and thermal overheads.

In certain aspects, with a synchronization signal block (SSB) periodicity of 20 ms (since the SSBs are the only guaranteed RSs in all 5G implementations), the wireless node may estimate an optimal beam weight that may lead to significant latencies which are greater than 0.5 seconds (e.g., 0.68 and 0.86 seconds, respectively) and can put Rx array performance gains tenuous with mobility.

In certain aspects, a wireless node may implement a fixed beam weight technique using fixed beam weights (e.g., that can be stored in a radio frequency integrated circuit (RFIC)) for each of the first antenna module 710, the second antenna module 720, and the third antenna module 730.

In a first step of this fixed beam weight technique, the wireless node separately trains each side of an antenna module. For example, the wireless node separately trains each side of the third antenna module 730 with a fixed and/or analog beamforming codebook of size K. A network entity may configure the size K of a candidate set of beams associated with the fixed and/or analog beamforming codebook. The wireless node determines a best beam from a candidate set of K beams (e.g., labeled as $g_{ij}$ where i=0,1 (i=0 may be horizontal polarization (H-polarization), i=1 may be vertical polarization (V-polarization)) and j=1, 2 (for the two sides of the third antenna module 730)). Alternately, the index i can denote slant −45 and slant-minus 45 polarizations, or left and right circular/elliptical polarizations. A search time for the best beam may be 4K during which time the wireless node may try H/V combinations on either side of the third antenna module 730 across two layers.

In a next step, the wireless node performs joint training of antennas on all sides of the antenna module. For example, the wireless node performs the joint training of antennas on both sides of the third antenna module 730 based on searching of different co-phasing factors. That is, the wireless node may consider a search over different beam combinations associated with the different co-phasing factors (e.g., $P_1$, $P_2$, $P_3$ and $P_4$) to form best combining beam weights. The different beam combinations may include HH combination $(g_{01}+e^{jP_1} g_{02})$, VH combination $(g_{11}+e^{jP_2} g_{02})$, HV combination $(g_{01}+e^{jP_3} g_{12})$, and VV combination $(g_{11}+e^{jP_4} g_{12})$. The co-phasing factor $P_k$ may come from a B-bit alphabet (e.g., B=2 or 3). The search time for this step may be 4*$2^B$ where the wireless node may search over HH+VV, VV+HH, HV+VH and VH+HV combinations on the two layers, respectively. The search time for both the steps may increase as K or B increases. Accordingly, the network entity may configure the K and the B to enable a better beam search process by trading off latency, power, and/or thermal issues.

Figure 8:
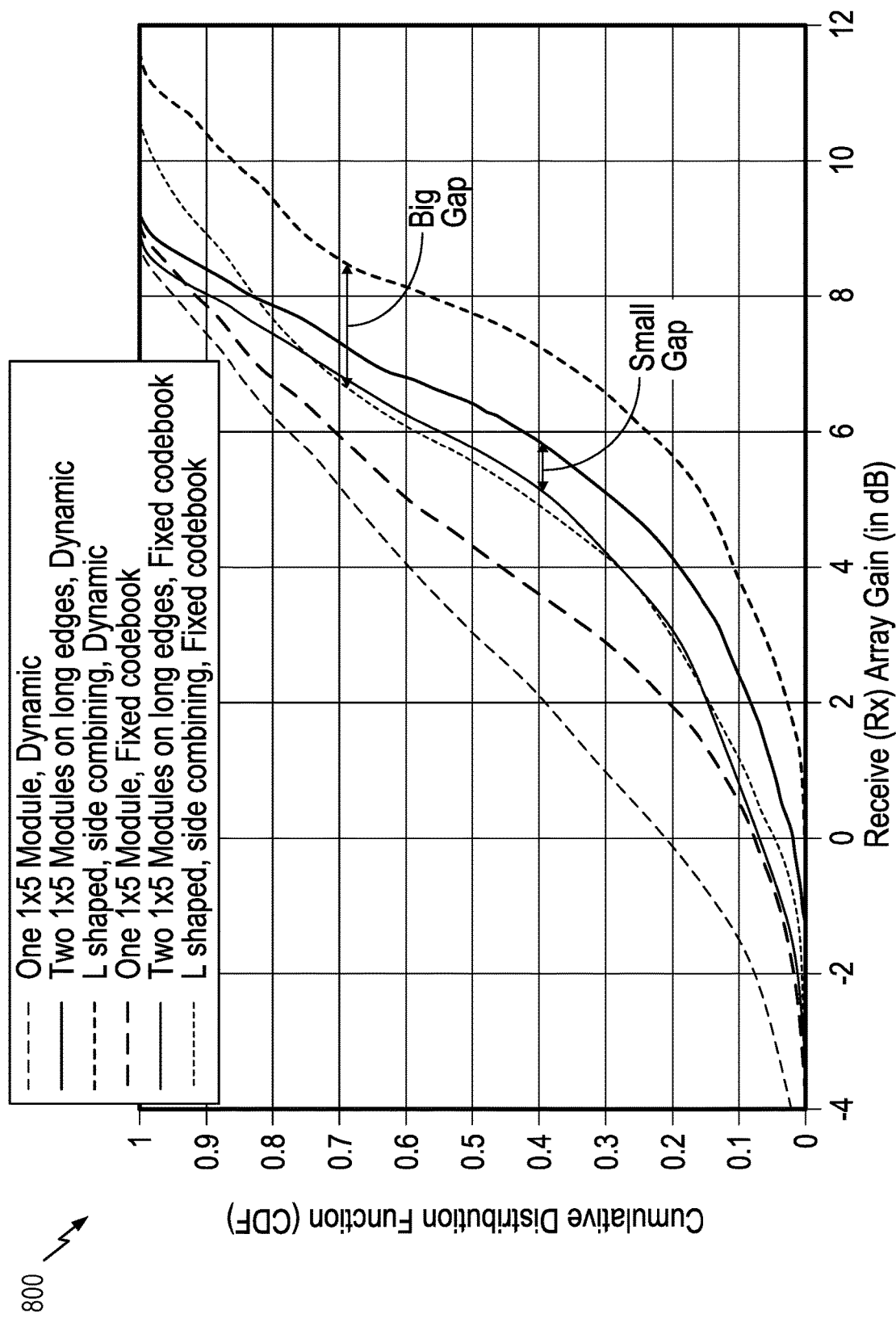
FIG. 8 depicts Rx array gains for different antenna modules of different wireless nodes or devices based on dynamic beamforming codebooks and fixed beamforming codebooks.

FIG. 8 depicts Rx array gains 800 for different antenna modules of different wireless nodes or devices based on dynamic beamforming codebooks and fixed beamforming codebooks. The antenna modules include a first antenna module (e.g., one 1×5 module), a second antenna module (e.g., which may include two subarrays such as two 1×5 arrays), and a third antenna module (e.g., L-shaped antenna module).

As depicted, the first antenna module based on a dynamic beamforming codebook has a higher Rx array gain than the first antenna module based on a fixed beamforming codebook. The second antenna module based on the dynamic beamforming codebook has a higher Rx array gain than the second antenna module based on the fixed beamforming codebook. The third antenna module based on the dynamic beamforming codebook has a higher Rx array gain than the third antenna module based on the fixed beamforming codebook. This is because a dynamic beamforming codebook technique can not only optimally generate beam weights, but also generate appropriate polarization, which is not possible with a fixed beamforming codebook technique.

As further depicted, a gap between the Rx array gain associated with the third antenna module based on the dynamic beamforming codebook and the Rx array gain associated with the third antenna module based on the fixed beamforming codebook is higher than a gap between the Rx array gain associated with the second antenna module based on the dynamic beamforming codebook and the Rx array gain associated with the second antenna module based on the fixed beamforming codebook. Also, the gap between the Rx array gain associated with the third antenna module based on the dynamic beamforming codebook and the Rx array gain associated with the third antenna module based on the fixed beamforming codebook is higher than a gap between the Rx array gain associated with the first antenna module based on the dynamic beamforming codebook and the Rx array gain associated with the first antenna module based on the fixed beamforming codebook.

FIG. 9 shows an example of a method 900 for wireless communications at a UE, such as a UE 104 of FIGS. 1 and 3.

Method 900 begins at step 905 with transmitting signaling indicating antenna module capability information comprising geometric shape information associated with one or more antenna modules of the UE. In some cases, the operations of this step refer to, or may be performed by, circuitry for transmitting and/or code for transmitting as described with reference to FIG. 11.

Method 900 then proceeds to step 910 with receiving an indication of a number of RSs where the number of RSs is based on the antenna module capability information. In some cases, the operations of this step refer to, or may be performed by, circuitry for receiving and/or code for receiving as described with reference to FIG. 11.

Method 900 then proceeds to step 915 with performing beamforming, in accordance with the received indication. In some cases, the operations of this step refer to, or may be performed by, circuitry for performing and/or code for performing as described with reference to FIG. 11.

In certain aspects, the antenna module capability information indicates a first number of RSs to achieve a first level of beamforming performance at the UE.

In certain aspects, the first number of RSs is based on at least one channel parameter associated with a channel between the UE and a network entity.

In certain aspects, the at least one channel parameter corresponds to an angular spread of a dominant cluster in the channel between the UE and the network entity.

In certain aspects, method 900 further includes receiving another indication of a set of RSs for the UE, and the first number of RSs is from within the set of RSs.

In certain aspects, the geometric shape information associated with a first antenna module of the one or more antenna modules indicates a first shape, and the first shape corresponds to L shape.

In certain aspects, the geometric shape information associated with a second antenna module of the one or more antenna modules indicates a second shape, and the second shape is different from the first shape.

In certain aspects, the geometric shape information associated with the one or more antenna modules indicates a number of sides of each of the one or more antenna modules.

In certain aspects, the geometric shape information associated with the one or more antenna modules indicates a number of antenna elements on each side of the number of sides of each of the one or more antenna modules.

In certain aspects, the number of RSs is based on the number of antenna elements on each side of the number of sides of each of the one or more antenna modules.

Figure 11:
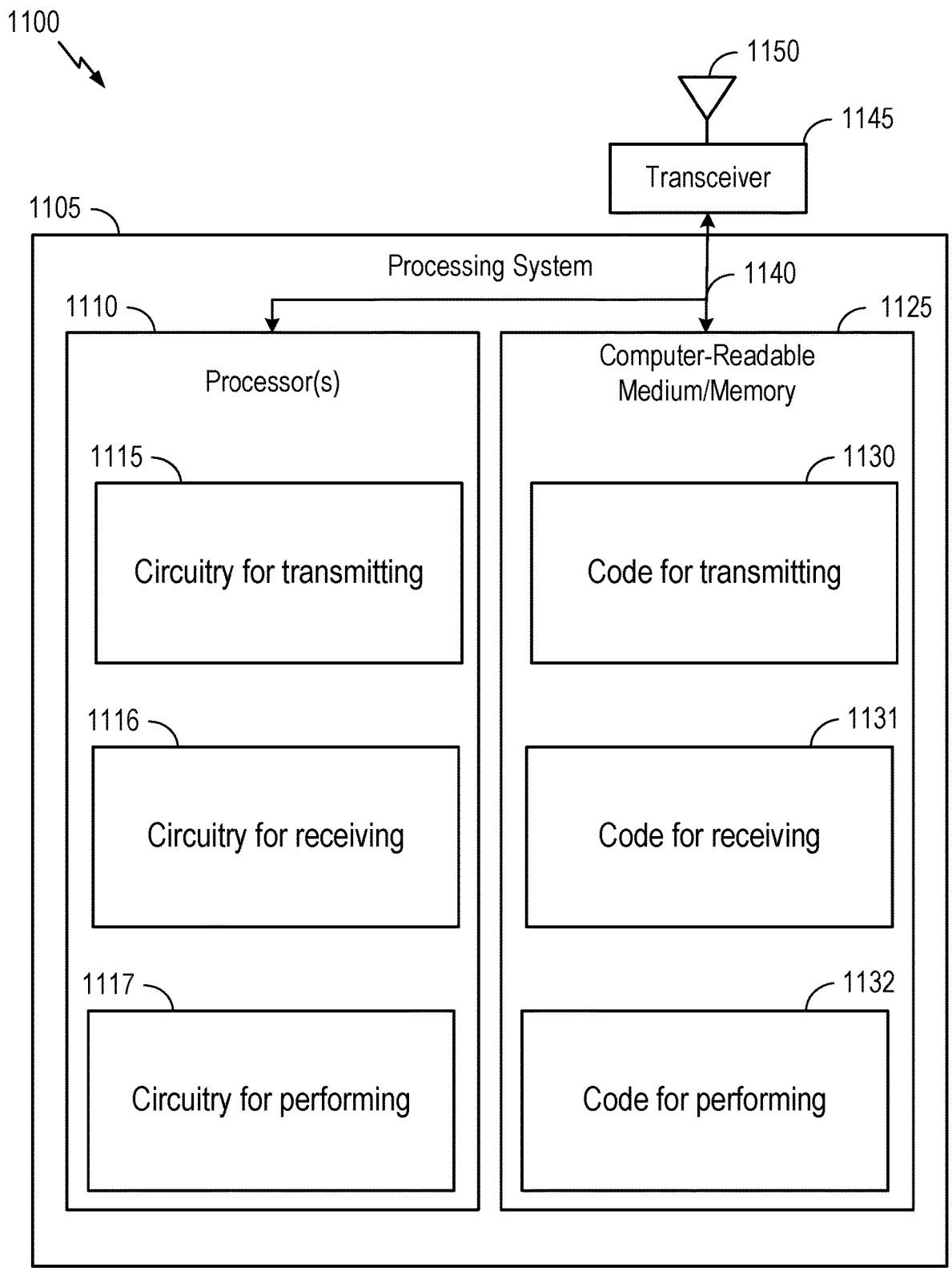
FIGS. 11 and 12 depict aspects of example communications devices.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
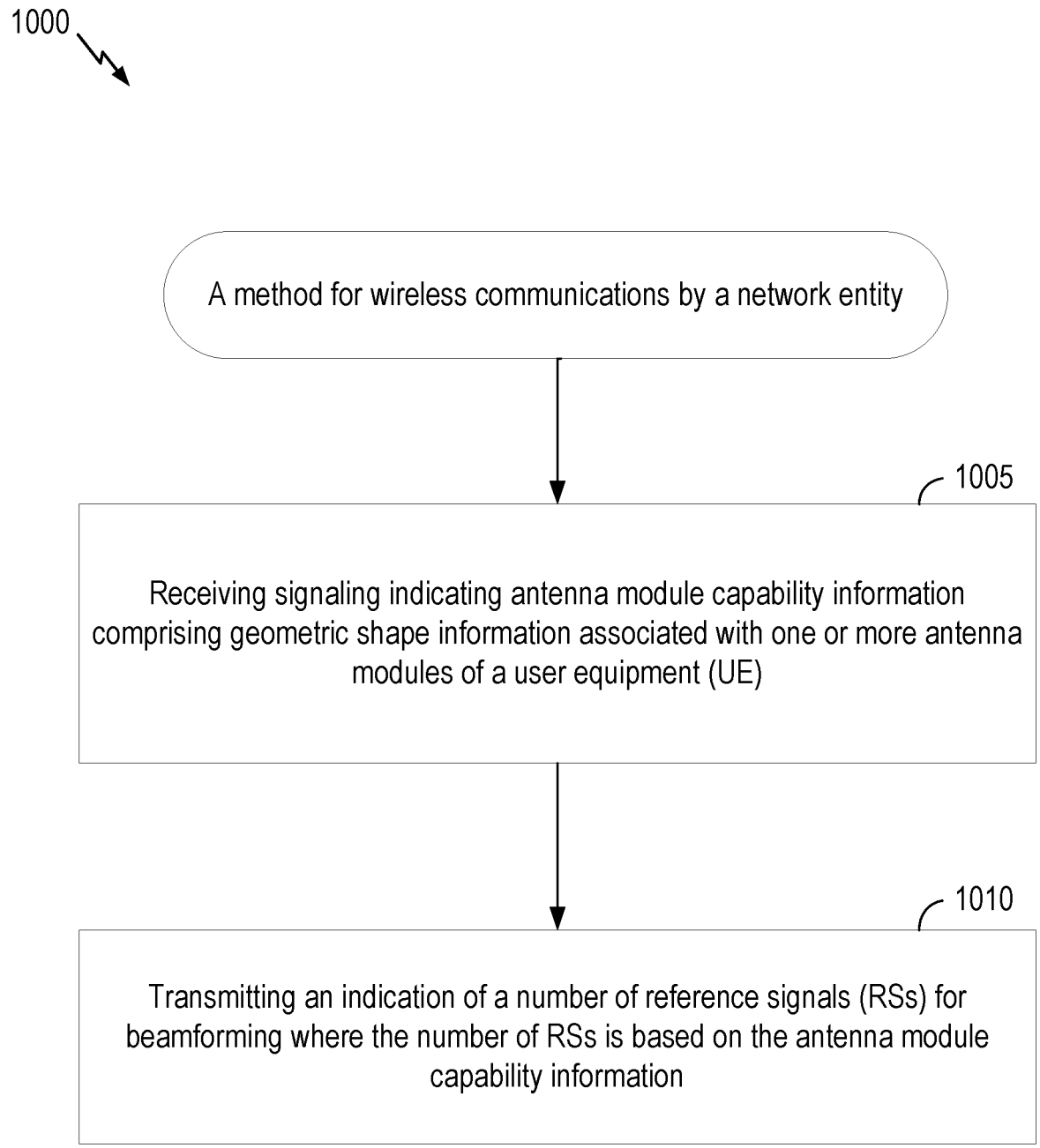
FIG. 10 depicts a method for wireless communications at a network entity.

FIG. 10 shows an example of a method 1000 for wireless communications at a network entity, such as a BS 102 of FIGS. 1 and 3, or a disaggregated BS as discussed with respect to FIG. 2.

Method 1000 begins at step 1005 with receiving signaling indicating antenna module capability information comprising geometric shape information associated with one or more antenna modules of a UE. In some cases, the operations of this step refer to, or may be performed by, circuitry for receiving and/or code for receiving as described with reference to FIG. 12.

Method 1000 then proceeds to step 1010 with transmitting an indication of a number of RSs for beamforming where the number of RSs is based on the antenna module capability information. In some cases, the operations of this step refer to, or may be performed by, circuitry for transmitting and/or code for transmitting as described with reference to FIG. 18.

In certain aspects, method 1000 further includes allocating a set of RSs for the UE and configuring the number of RSs from the set of RSs for the UE.

In certain aspects, the antenna module capability information indicates a first number of RSs to achieve a first level of beamforming performance at the UE.

In certain aspects, the first number of RSs is based on at least one channel parameter associated with a channel between the UE and the network entity.

In certain aspects, the at least one channel parameter corresponds to an angular spread of a dominant cluster in the channel between the UE and the network entity.

In certain aspects, method 1000 further includes transmitting another indication of a set of RSs for the UE, and the first number of RSs is from within the set of RSs.

In certain aspects, the geometric shape information associated with a first antenna module of the one or more antenna modules indicates a first shape, and the first shape corresponds to L shape.

In certain aspects, the geometric shape information associated with a second antenna module of the one or more antenna modules indicates a second shape, and the second shape is different from the first shape.

In certain aspects, the geometric shape information associated with the one or more antenna modules indicates a number of sides of each of the one or more antenna modules.

In certain aspects, the geometric shape information associated with the one or more antenna modules indicates a number of antenna elements on each side of the number of sides of each of the one or more antenna modules.

In certain aspects, the number of RSs is based on the number of antenna elements on each side of the number of sides of each of the one or more antenna modules.

Figure 12:
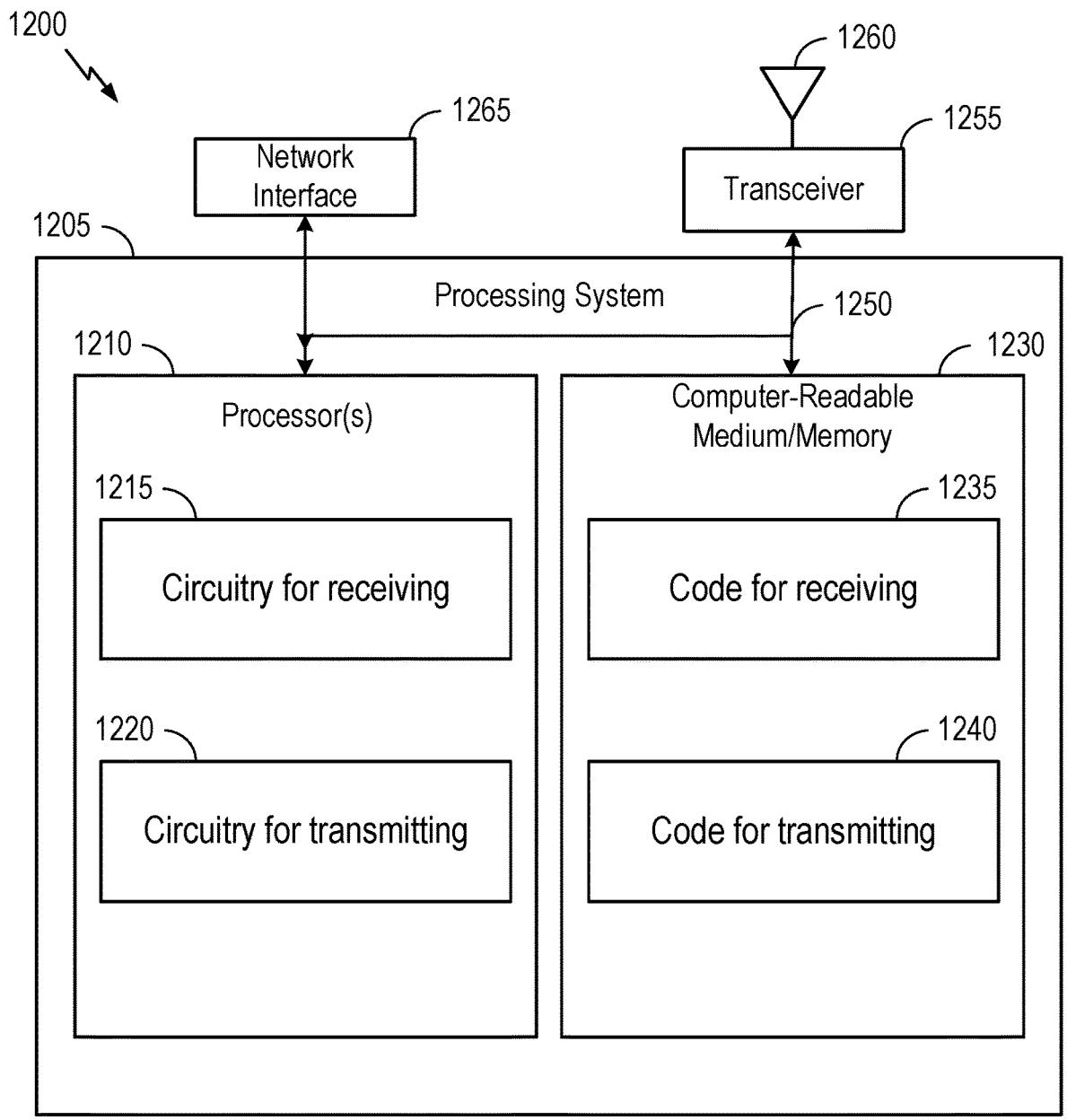

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Communications Devices

FIG. 11 depicts aspects of an example communications device 1100. In some aspects, communications device 1100 is a user equipment (UE), such as UE 104 described above with respect to FIGS. 1 and 3.

The communications device 1100 includes a processing system 1105 coupled to the transceiver 1145 (e.g., a transmitter and/or a receiver). The transceiver 1145 is configured to transmit and receive signals for the communications device 1100 via the antenna 1150, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 900 described with respect to FIG. 9 and/or any aspect related to it. Note that reference to a processor performing a function of communications device 1100 may include one or more processors 1110 performing that function of communications device 1100.

In the depicted example, computer-readable medium/memory 1125 stores code (e.g., executable instructions), such as code for transmitting 1130, code for receiving 1131, and code for performing 1132. Processing of the code for transmitting 1130, the code for receiving 1131, and the code for performing 1132 may cause the communications device 1100 to perform the method 900 described with respect to FIG. 9 and/or any aspect related to it.

The one or more processors 1110 include circuitry configured to implement (e.g., execute) the code stored in the computer-readable medium/memory 1125, including circuitry such as circuitry for transmitting 1115, circuitry for receiving 1116, and circuitry for performing 1117. Processing with the circuitry for transmitting 1115, the circuitry for receiving 1116, and the circuitry for performing 1117 may cause the communications device 1100 to perform the method 900 described with respect to FIG. 9 and/or any aspect related to it.

Various components of the communications device 1100 may provide means for performing the method 900 described with respect to FIG. 9 and/or any aspect related to it. For example, means for transmitting, sending or outputting for transmission may include transceivers 354 and/or antenna(s) 352 of the UE 104 illustrated in FIG. 3 and/or the circuitry for transmitting 1115, the code for transmitting 1130, the transceiver 1145 and the antenna 1150 of the communications device 1100 in FIG. 11. Means for receiving or obtaining may include transceivers 354 and/or antenna(s) 352 of the UE 104 illustrated in FIG. 3 and/or the circuitry for receiving 1116, the code for receiving 1131, the transceiver 1145 and the antenna 1150 of the communications device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 11 is an example, and many other examples and configurations of communication device 1100 are possible.

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to the transceiver 1255 (e.g., a transmitter and/or a receiver) and/or a network interface 1265. The transceiver 1255 is configured to transmit and receive signals for the communications device 1200 via the antenna 1260, such as the various signals as described herein. The network interface 1265 is configured to obtain and send signals for the communications device 1200 via communication link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1000 described with respect to FIG. 10 or any aspect related to it. Note that reference to a processor of communications device 1200 performing a function may include one or more processors 1210 of communications device 1200 performing that function.

In the depicted example, the computer-readable medium/memory 1230 stores code (e.g., executable instructions), such as code for receiving 1235 and code for transmitting 1240. Processing of the code for receiving 1235 and the code for transmitting 1240 may cause the communications device 1200 to perform the method 1000 described with respect to FIG. 10 or any aspect related to it.

The one or more processors 1210 include circuitry configured to implement (e.g., execute) the code stored in the computer-readable medium/memory 1230, including circuitry such as circuitry for receiving 1215 and circuitry for transmitting 1220. Processing with the circuitry for receiving 1215 and the circuitry for transmitting 1220 may cause the communications device 1200 to perform the method 1000 described with respect to FIG. 10 or any aspect related to it.

Various components of the communications device 1200 may provide means for performing the method 1000 described with respect to FIG. 10 or any aspect related to it. Means for transmitting, sending or outputting for transmission may include transceivers 332 and/or antenna(s) 334 of the BS 102 illustrated in FIG. 3 and/or the circuitry for transmitting 1220, the code for transmitting 1240, the transceiver 1255 and the antenna 1260 of the communications device 1200 in FIG. 12. Means for receiving or obtaining may include transceivers 332 and/or antenna(s) 334 of the BS 102 illustrated in FIG. 3 and/or the circuitry for receiving 1215, the code for receiving 1235, the transceiver 1255 and the antenna 1260 of the communications device 1200 in FIG. 12.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 12 is an example, and many other examples and configurations of communication device 1200 are possible.

Example Clauses

Implementation examples are described in the following numbered clauses:

Clause 1: A method for wireless communications by a user equipment (UE), comprising: transmitting signaling indicating antenna module capability information comprising geometric shape information associated with one or more antenna modules of the UE; receiving an indication of a number of reference signals (RSs), wherein the number of RSs is based on the antenna module capability information; and performing beamforming, in accordance with the received indication.

Clause 2: The method of clause 1, wherein the antenna module capability information indicates a first number of RSs to achieve a first level of beamforming performance at the UE.

Clause 3: The method of any one of clauses 1-2, wherein the first number of RSs is based on at least one channel parameter associated with a channel between the UE and a network entity.

Clause 4: The method of any one of clauses 1-3, wherein the at least one channel parameter corresponds to an angular spread of a dominant cluster in the channel between the UE and the network entity.

Clause 5: The method of any one of clauses 1-4, further comprising receiving another indication of a set of RSs for the UE, wherein the first number of RSs is from within the set of RSs.

Clause 6: The method of any one of clauses 1-5, wherein the geometric shape information associated with a first antenna module of the one or more antenna modules indicates a first shape, and wherein the first shape corresponds to L shape.

Clause 7: The method of any one of clauses 1-6, wherein the geometric shape information associated with a second antenna module of the one or more antenna modules indicates a second shape, and wherein the second shape is different from the first shape.

Clause 8: The method of any one of clauses 1-7, wherein the geometric shape information associated with the one or more antenna modules indicates a number of sides of each of the one or more antenna modules.

Clause 9: The method of any one of clauses 1-8, wherein the geometric shape information associated with the one or more antenna modules indicates a number of antenna elements on each side of the number of sides of each of the one or more antenna modules.

Clause 10: The method of any one of clauses 1-9, wherein the number of RSs is based on the number of antenna elements on each side of the number of sides of each of the one or more antenna modules.

Clause 11: A method for wireless communications by a network entity, comprising: receiving signaling indicating antenna module capability information comprising geometric shape information associated with one or more antenna modules of a user equipment (UE); and transmitting an indication of a number of reference signals (RSS) for beamforming, wherein the number of RSs is based on the antenna module capability information.

Clause 12: The method of clause 11, further comprising: allocating a set of RSs for the UE; and configuring the number of RSs from the set of RSs for the UE.

Clause 13: The method of any one of clauses 11-12, wherein the antenna module capability information indicates a first number of RSs to achieve a first level of beamforming performance at the UE.

Clause 14: The method of any one of clauses 11-13, wherein the first number of RSs is based on at least one channel parameter associated with a channel between the UE and the network entity.

Clause 15: The method of any one of clauses 11-14, wherein the at least one channel parameter corresponds to an angular spread of a dominant cluster in the channel between the UE and the network entity.

Clause 16: The method of any one of clauses 11-15, further comprising transmitting another indication of a set of RSs for the UE, wherein the first number of RSs is from within the set of RSs.

Clause 17: The method of any one of clauses 11-16, wherein the geometric shape information associated with a first antenna module of the one or more antenna modules indicates a first shape, and wherein the first shape corresponds to L shape.

Clause 18: The method of any one of clauses 11-17, wherein the geometric shape information associated with a second antenna module of the one or more antenna modules indicates a second shape, and wherein the second shape is different from the first shape.

Clause 19: The method of any one of clauses 11-18, wherein the geometric shape information associated with the one or more antenna modules indicates a number of sides of each of the one or more antenna modules.

Clause 20: The method of any one of clauses 11-19, wherein the geometric shape information associated with the one or more antenna modules indicates a number of antenna elements on each side of the number of sides of each of the one or more antenna modules.

Clause 21: The method of any one of clauses 11-20, wherein the number of RSs is based on the number of antenna elements on each side of the number of sides of each of the one or more antenna modules.

Clause 22: An apparatus, comprising: a memory comprising executable instructions; and a processor configured to execute the executable instructions and cause the apparatus to perform a method in accordance with any one of Clauses 1-21.

Clause 23: An apparatus, comprising means for performing a method in accordance with any one of Clauses 1-21.

Clause 24: A non-transitory computer-readable medium comprising executable instructions that, when executed by a processor of an apparatus, cause the apparatus to perform a method in accordance with any one of Clauses 1-21.

Clause 25: A computer program product embodied on a computer-readable storage medium comprising code for performing a method in accordance with any one of Clauses 1-21.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE), comprising:
 a processor;
 a memory coupled with the processor; and
 instructions stored in the memory and executable by the processor to cause the apparatus to:
  transmit signaling indicating antenna module capability information comprising geometric shape information associated with one or more antenna modules of the UE;
  receive an indication of a number of reference signals (RSs), wherein the number of RSs is based on the antenna module capability information; and
  perform beamforming, in accordance with the received indication, wherein:
   the antenna module capability information indicates a first number of RSs to achieve a first level of beamforming performance at the UE; and
   the instructions stored in the memory and executable by the processor further cause the apparatus to receive another indication of a set of RSs for the UE, wherein the first number of RSs is from within the set of RSs.

2. The apparatus of claim 1, wherein the first number of RSs is based on at least one channel parameter associated with a channel between the UE and a network entity.

3. The apparatus of claim 2, wherein the at least one channel parameter corresponds to an angular spread of a dominant cluster in the channel between the UE and the network entity.

4. The apparatus of claim 1, wherein the geometric shape information associated with a first antenna module of the one or more antenna modules indicates a first shape, and wherein the first shape corresponds to L shape.

5. The apparatus of claim 4, wherein the geometric shape information associated with a second antenna module of the one or more antenna modules indicates a second shape, and wherein the second shape is different from the first shape.

6. The apparatus of claim 1, wherein the geometric shape information associated with the one or more antenna modules indicates a number of sides of each of the one or more antenna modules.

7. The apparatus of claim 6, wherein the geometric shape information associated with the one or more antenna modules indicates a number of antenna elements on each side of the number of sides of each of the one or more antenna modules.

8. The apparatus of claim 7, wherein the number of RSs is based on the number of antenna elements on each side of the number of sides of each of the one or more antenna modules.

9. An apparatus for wireless communications at a network entity, comprising:

a processor;
a memory coupled with the processor; and
instructions stored in the memory and executable by the processor to cause the apparatus to:
receive signaling indicating antenna module capability information comprising geometric shape information associated with one or more antenna modules of a user equipment (UE); and
transmit an indication of a number of reference signals (RSs) for beamforming, wherein the number of RSs is based on the antenna module capability information, and wherein:
the antenna module capability information indicates a first number of RSs to achieve a first level of beamforming performance at the UE; and
the instructions stored in the memory and executable by the processor further cause the apparatus to transmit another indication of a set of RSs for the UE, wherein the first number of RSs is from within the set of RSs.

10. The apparatus of claim 9, wherein the instructions stored in the memory and executable by the processor further cause the apparatus to:
allocate a set of RSs for the UE; and
configure the number of RSs from the set of RSs for the UE.

11. The apparatus of claim 9, wherein the first number of RSs is based on at least one channel parameter associated with a channel between the UE and the network entity.

12. The apparatus of claim 11, wherein the at least one channel parameter corresponds to an angular spread of a dominant cluster in the channel between the UE and the network entity.

13. The apparatus of claim 9, wherein the geometric shape information associated with a first antenna module of the one or more antenna modules indicates a first shape, and wherein the first shape corresponds to L shape.

14. The apparatus of claim 13, wherein the geometric shape information associated with a second antenna module of the one or more antenna modules indicates a second shape, and wherein the second shape is different from the first shape.

15. The apparatus of claim 9, wherein the geometric shape information associated with the one or more antenna modules indicates a number of sides of each of the one or more antenna modules.

16. The apparatus of claim 15, wherein the geometric shape information associated with the one or more antenna modules indicates a number of antenna elements on each side of the number of sides of each of the one or more antenna modules.

17. The apparatus of claim 16, wherein the number of RSs is based on the number of antenna elements on each side of the number of sides of each of the one or more antenna modules.

18. A method for wireless communications by a user equipment (UE), comprising:
transmitting signaling indicating antenna module capability information comprising geometric shape information associated with one or more antenna modules of the UE;
receiving an indication of a number of reference signals (RSs), wherein the number of RSs is based on the antenna module capability information; and
performing beamforming, in accordance with the received indication, wherein:
the antenna module capability information indicates a first number of RSs to achieve a first level of beamforming performance at the UE; and
the method further comprising receiving another indication of a set of RSs for the UE, wherein the first number of RSs is from within the set of RSs.

19. The method of claim 18, wherein the first number of RSs is based on at least one channel parameter associated with a channel between the UE and a network entity.

20. The method of claim 19, wherein the at least one channel parameter corresponds to an angular spread of a dominant cluster in the channel between the UE and the network entity.

21. A method for wireless communications by a network entity, comprising:
receiving signaling indicating antenna module capability information comprising geometric shape information associated with one or more antenna modules of a user equipment (UE); and
transmitting an indication of a number of reference signals (RSs) for beamforming, wherein the number of RSs is based on the antenna module capability information, and wherein:
the antenna module capability information indicates a first number of RSs to achieve a first level of beamforming performance at the UE; and
the first number of RSs is based on at least one channel parameter associated with a channel between the UE and the network entity.

22. The method of claim 21, further comprising:
allocating a set of RSs for the UE; and
configuring the number of RSs from the set of RSs for the UE.

* * * * *